Figure 1:
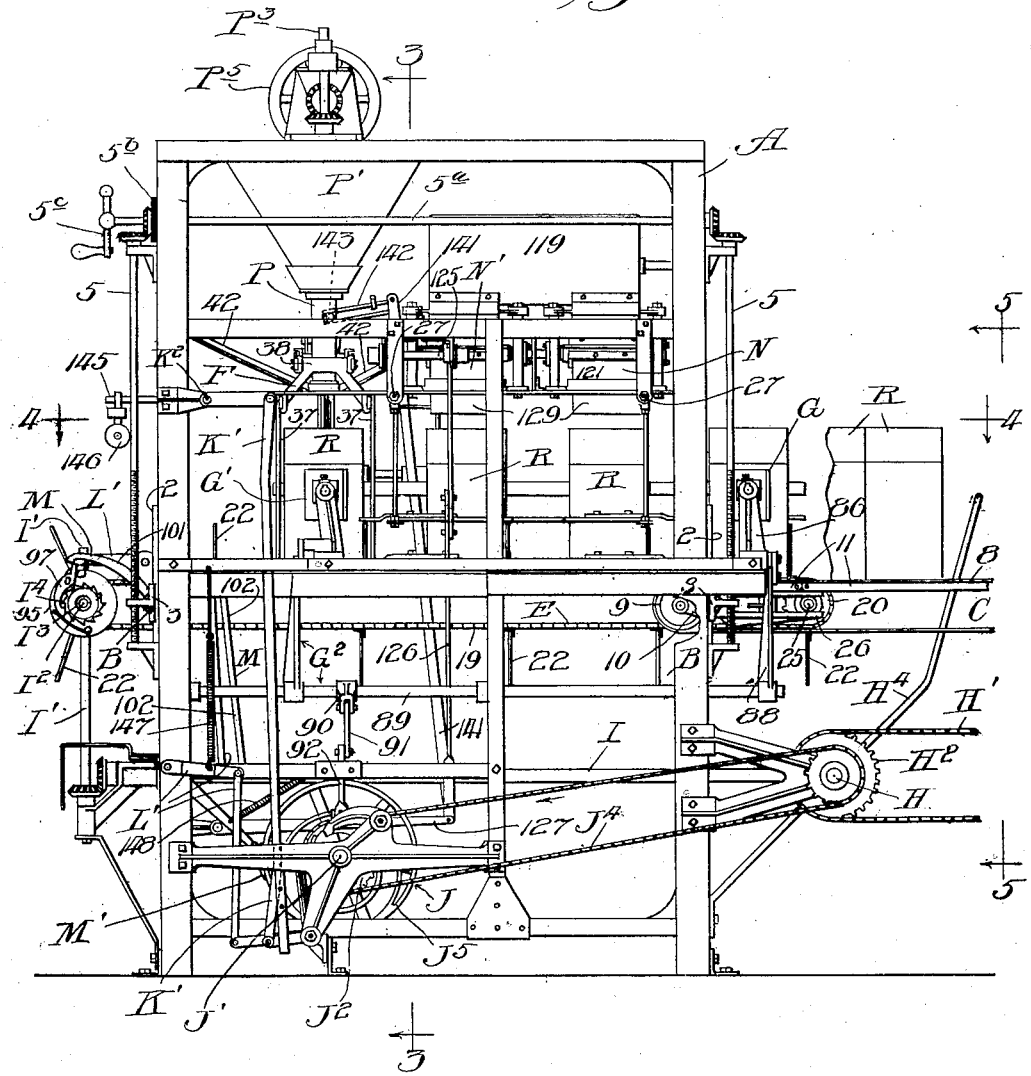

C. REDD.
CARTON FILLING AND WEIGHING MACHINE.
APPLICATION FILED AUG. 29, 1917.

1,262,256.

Patented Apr. 9, 1918.
9 SHEETS—SHEET 1.

Inventor:
Charlie Redd

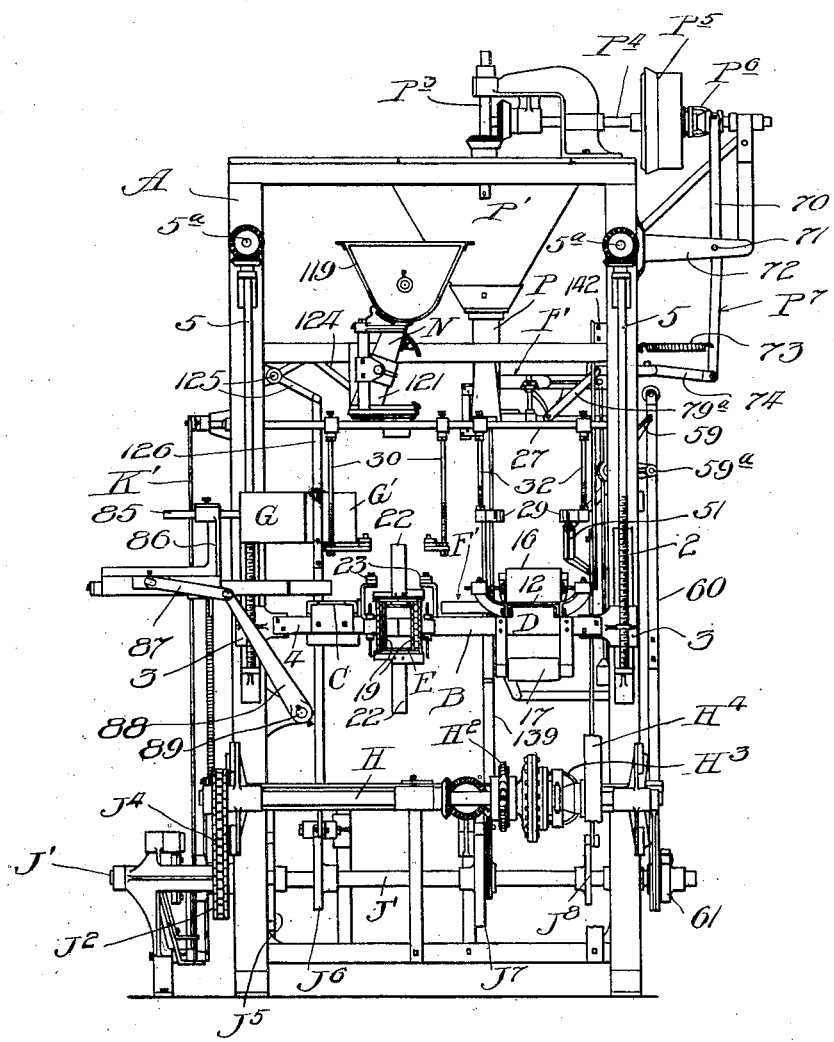

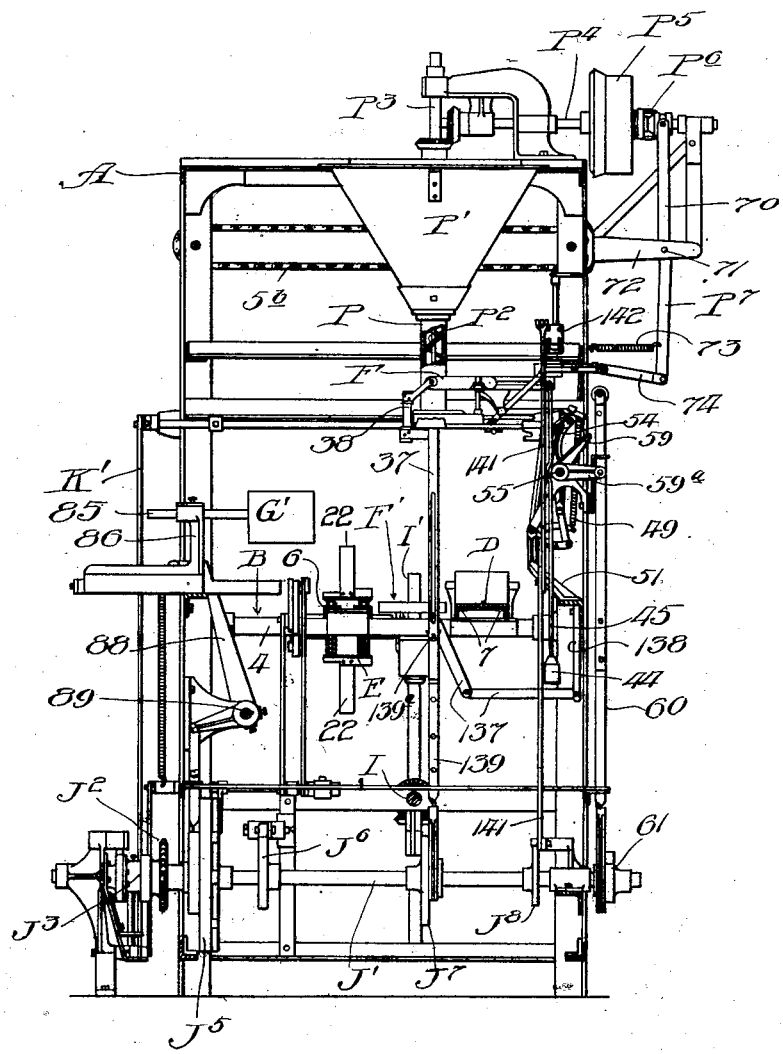

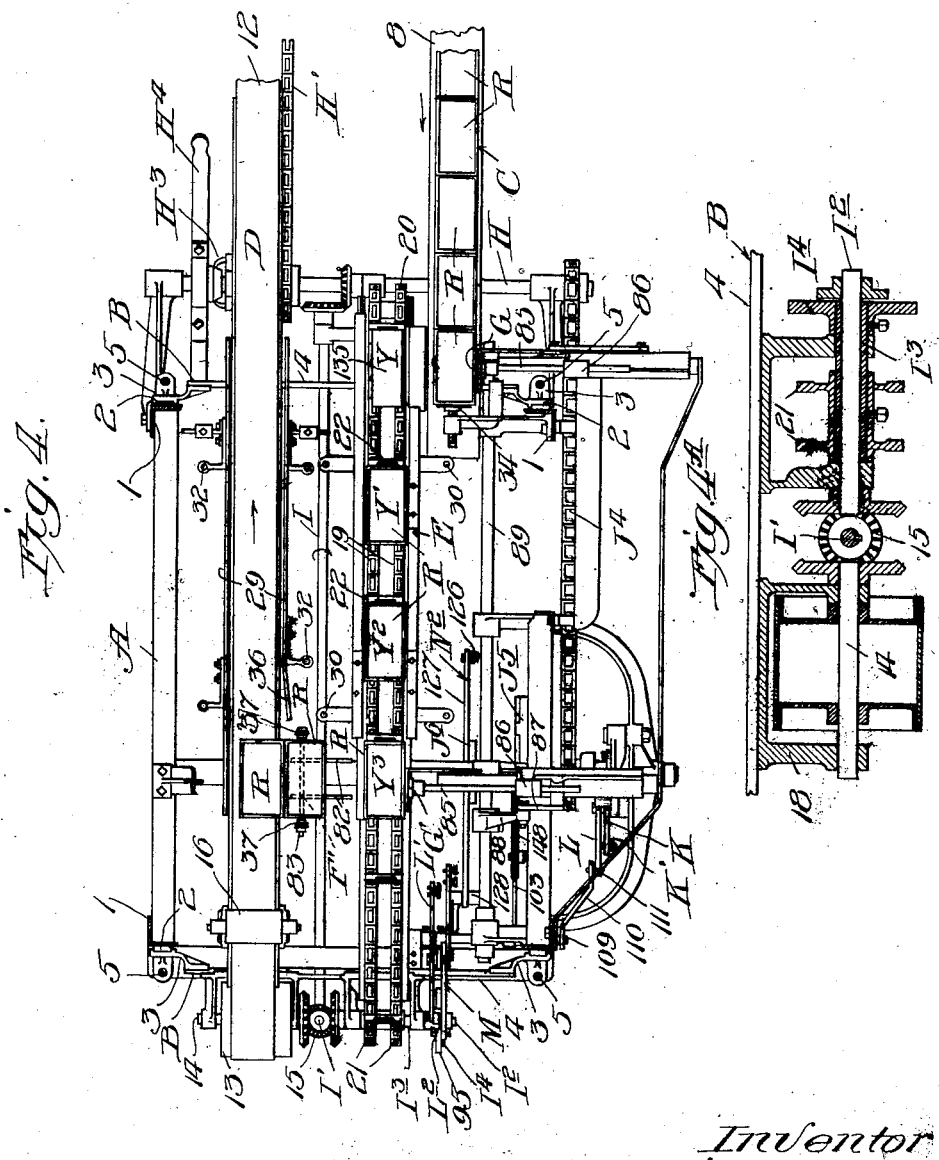

C. REDD.
CARTON FILLING AND WEIGHING MACHINE.
APPLICATION FILED AUG. 29, 1917.
1,262,256.
Patented Apr. 9, 1918.
9 SHEETS—SHEET 5.
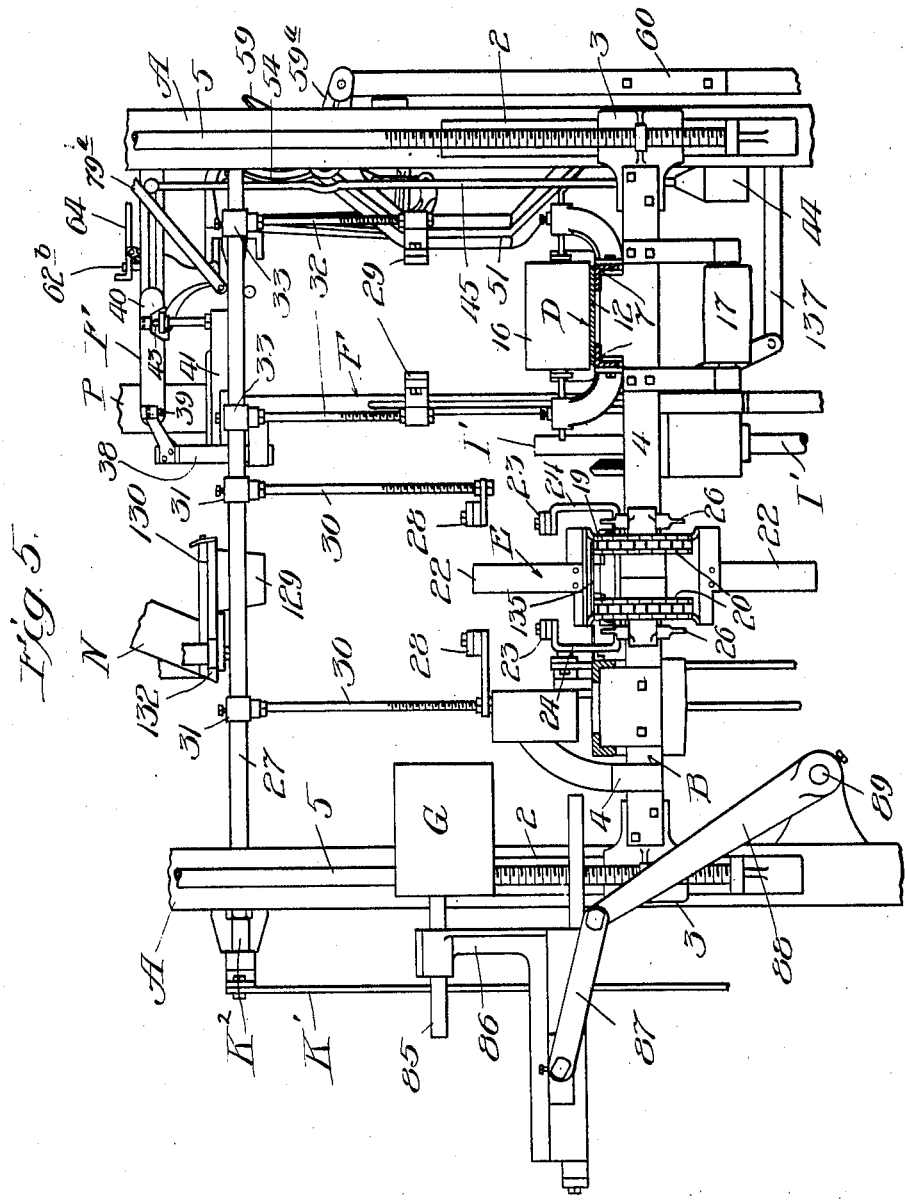
Inventor:
Charlie Redd C. REDD.
CARTON FILLING AND WEIGHING MACHINE.
APPLICATION FILED AUG. 29, 1917.
1,262,256.
Patented Apr. 9, 1918.
9 SHEETS—SHEET 6.
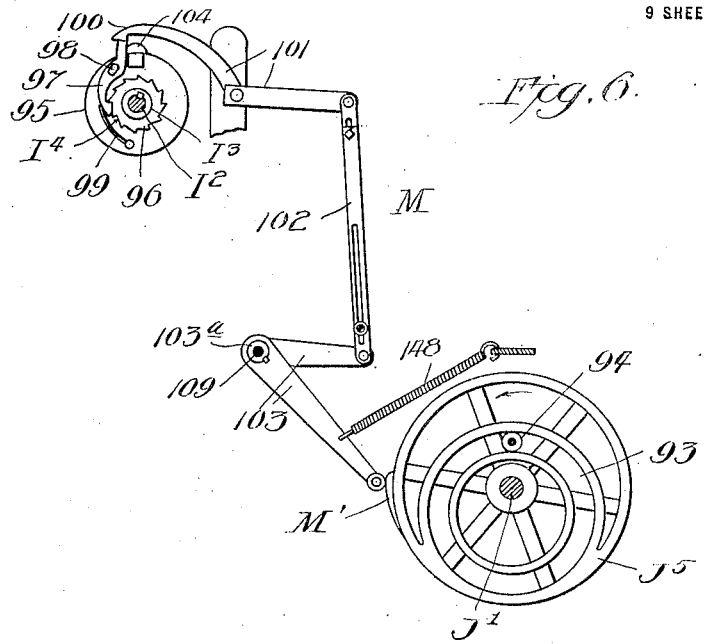
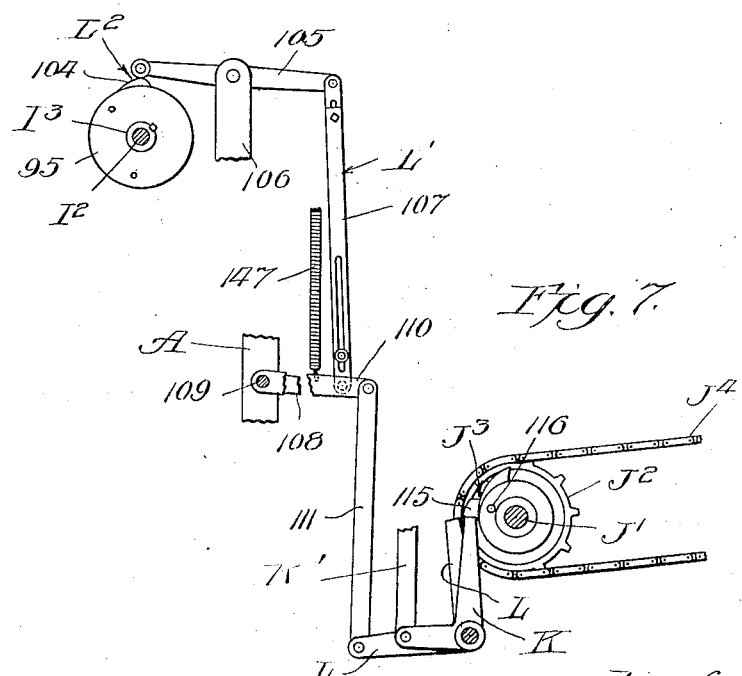
Inventor:
Charlie Redd
by Dyrenforth, Lee, Chritton & Wiles,
Attys

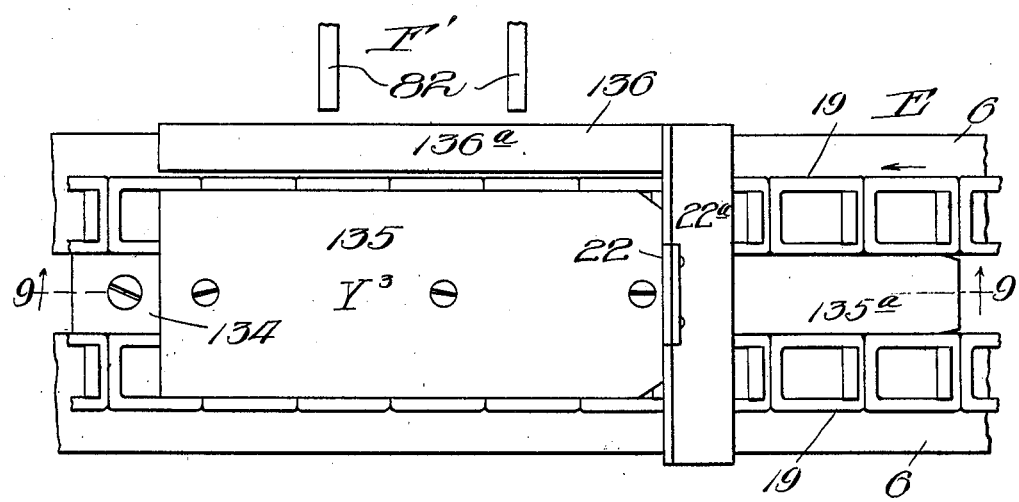
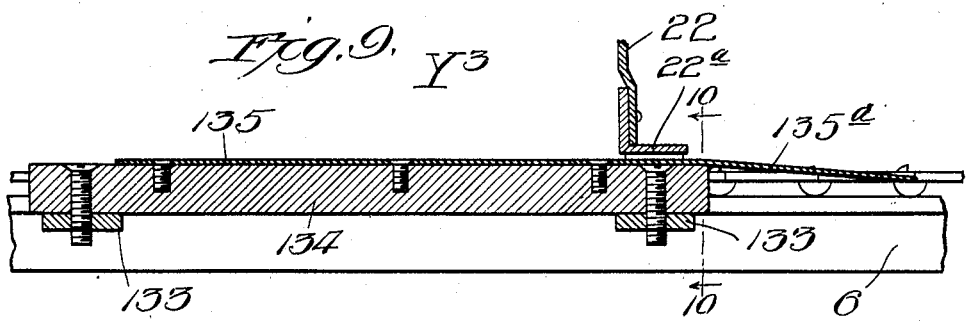
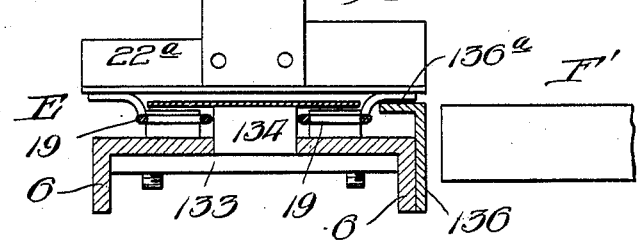

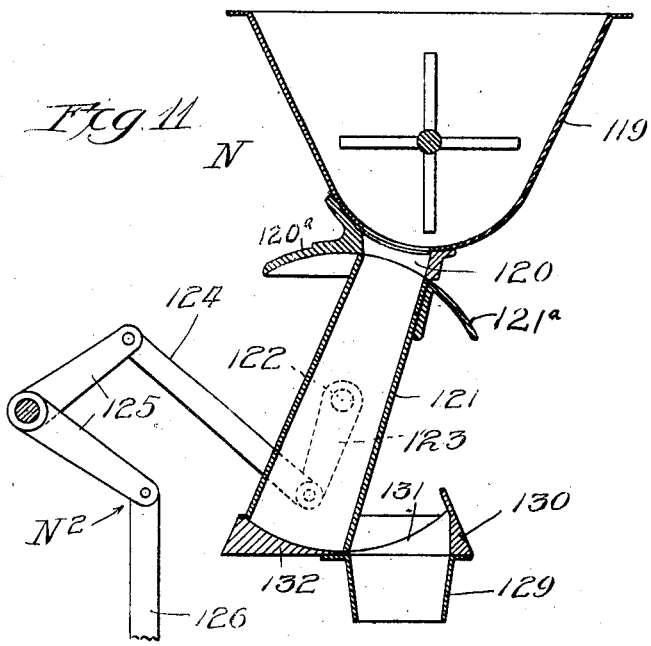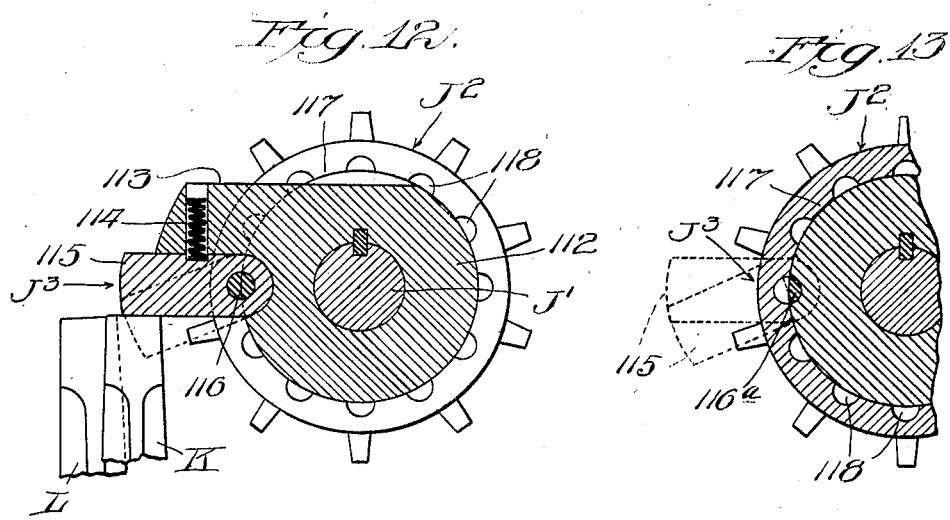

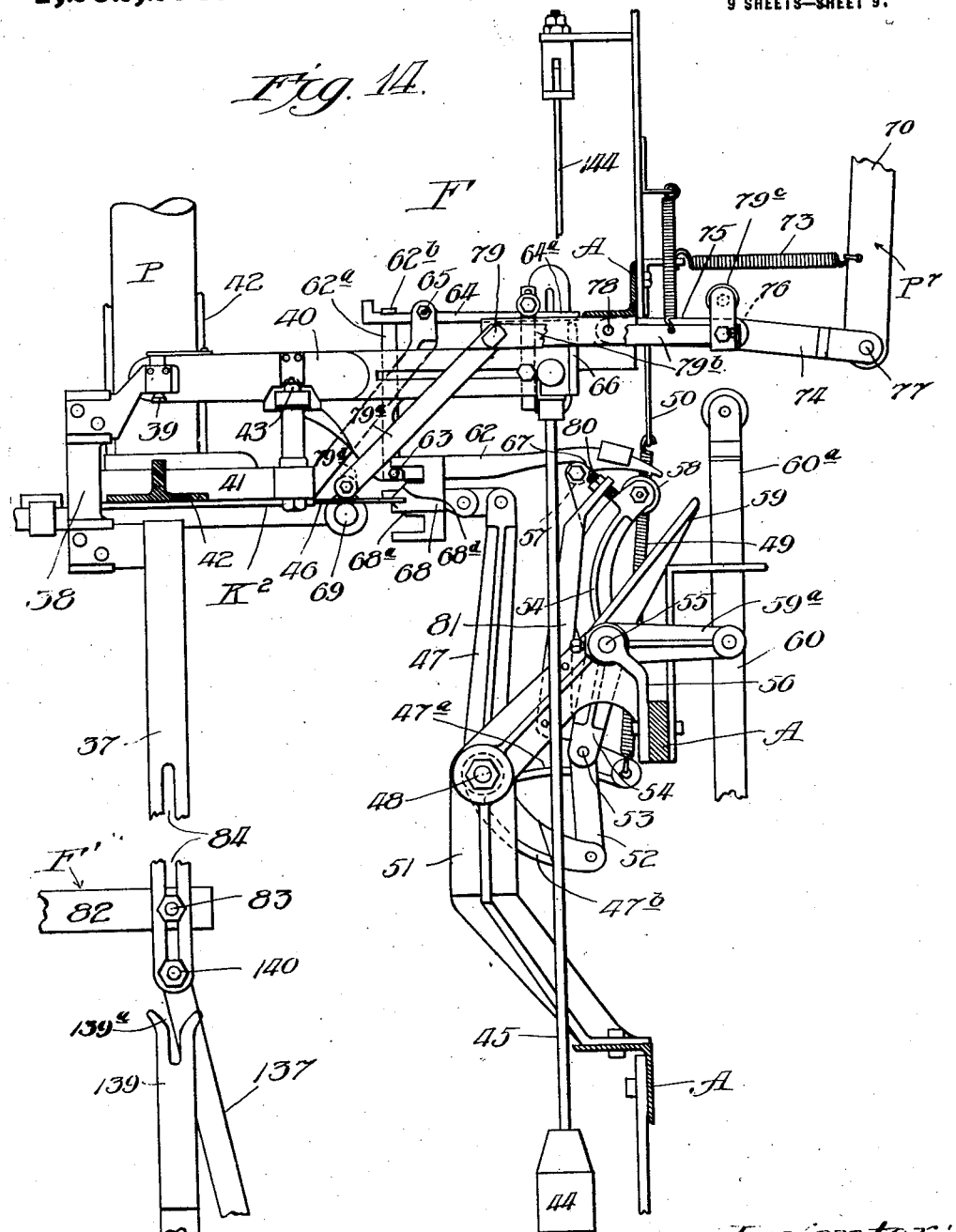

UNITED STATES PATENT OFFICE.

CHARLIE REDD, OF CHICAGO, ILLINOIS, ASSIGNOR TO ISAAC PIESER, OF CHICAGO, ILLINOIS.

CARTON FILLING AND WEIGHING MACHINE.

1,262,256.   Specification of Letters Patent.   Patented Apr. 9, 1918.

Application filed August 29, 1917. Serial No. 188,841.

*To all whom it may concern:*

Be it known that I, CHARLIE REDD, a citizen of the United States, residing at Chicago, in the county of Cook and State of Illinois, have invented a new and useful Carton Filling and Weighing Machine, of which the following is a specification.

This invention relates particularly to machines adapted to the purpose of filling cartons or other packages with accurately weighed charges of pulverulent or granular material; and the primary object of the invention is to provide an improved machine of high capacity, which will operate with accuracy and certainty, and which possesses great durability.

To facilitate an understanding of the detailed description of the invention, which follows, it may be stated at the outset that in the preferred embodiment there are employed: a continuously operating endless delivery-conveyer leading to the machine; an endless discharge conveyer parallel therewith, but extending further into the machine; an interposed endless service-conveyer having a step-by-step movement; a scale having a load-platform or scale-pan interposed between the service conveyer and the discharge-conveyer; a pair of partial-charge filling devices disposed above the service-conveyer, each operating, when desired, to deliver a partial charge to the carton under it, so that each carton receives a portion of its charge from each of said filling devices, the aggregate weight of the partial charges, however, being somewhat less than the desired weight of material for the complete charge; a pair of transversely acting carton-transferrers, one of which operates to deliver a carton from the delivery-conveyer to the service-conveyer, while the other operates to deliver a carton from the rear end of the service conveyer to the scale-pan and at the same time to shove the filled and weighed carton from the scale-pan to the discharge-conveyer; driving mechanism for the carton-transferring means, which serves also to operate the partial-charge filling devices, said driving mechanism being controlled by a scale-controlled controlling device and also controlled by a controlling device timed with the driving mechanism of the service-conveyer; and driving mechanism for the service-conveyer adapted to intermittently actuate the same or give to the service conveyer a step-by-step movement, said last-named driving mechanism having associated therewith controlling means timed with the movement of the service conveyer and serving to control the operation of the driving mechanism for the carton-transferrers and the partial-charge filling devices.

Thus, the transferring devices and the partial-charge filling devices can operate only after the service conveyer has stopped and the scale has been tripped in the weighing operation; and the service-conveyer can be advanced only after the completion of the operation of the transferring devices and the partial-charge filling devices.

The invention is illustrated in the preferred embodiment in the accompanying drawings, in which—

Figure 1 represents a side elevational view, certain parts being shown brokenly, of a machine embodying the invention; Fig. 2, a front end elevational view of the machine; Fig. 3, a transverse vertical sectional view, taken as indicated at line 3 of Fig. 1; Fig. 4, a plan sectional view taken approximately as indicated at line 4—4 of Fig. 1; Fig. 4ª, a plan sectional view of the driving and controlling mechanism located at the rear end of the machine; Fig. 5, an enlarged broken view taken as indicated at line 5 of Fig. 1; Fig. 6, a view illustrating the means controlled by the driving mechanism of the transfer devices and serving to control the operation of the driving mechanism of the service-conveyer; Fig. 7, a view illustrating the means controlled by the driving mechanism of the service-conveyer and controlling the operation of the driving mechanism of the transferring devices, this view showing also a portion of the scale-controlled means, which also controls the driving mechanism of the transferring devices; Fig. 8, an enlarged broken plan view of the service conveyer, showing the bridge or carton-support with which the service conveyer is equipped adjacent the scale-pan; Fig. 9, a vertical longitudinal section taken as indicated at line 9 of Fig. 8; Fig. 10, a vertical transverse section taken as indicated at line 10 of Fig. 9; Fig. 11, a vertical transverse sectional view, showing one of the partial-charge filling devices; Fig. 12, a sectional view illustrating the scale-controlled clutch (which is also controlled from the driving mechanism of the service conveyer) with which the driving mechanism of the transferring devices is equipped; Fig. 13, a broken sectional view of said clutch device, taken in a parallel plane; and Fig. 14, an enlarged broken elevational view, showing the mechanism of the scale employed.

In the preferred embodiment of the invention, which is illustrated, A represents the main frame; B, a horizontally disposed, vertically adjustable conveyer-supporting frame, comprising a pair of horizontal bars, one located at each end of the main frame and having its ends slidably connected with the corner uprights of the main frame, and conveyer-track bars connecting the transverse bars; C (Figs. 1 and 4), a continuously operating, endless delivery-conveyer having its rear end mounted on the front cross-bar of the adjustable frame B; D, a continuously operating discharge-conveyer mounted on the adjustable frame B and extending parallel with the conveyer C, and serving to convey the filled and weighed cartons from the rear portion of the machine forwardly; E, an intermittently actuated service-conveyer mounted on the adjustable frame B and interposed between the conveyers C and D; F, a scale provided with a load-platform, or scale-pan, $F^1$ which is interposed between the rear portions of the discharge-conveyer D and the service conveyer E; G, G', a pair of pushers forming a portion of carton-transfer mechanism $G^2$, said pushers serving to transfer simultaneously a package from the rear end of the conveyer C to the front end of the conveyer E and from the rear portion of the conveyer E to the scale-pan, the pusher $G^1$ serving, also, while effecting transfer of a package from the conveyer E to the scale-pan, to shove the weighed package onto the rear portion of the conveyer D; H, the main drive-shaft of the machine, which receives its power from a chain $H^1$, which operates a sprocket-wheel $H^2$, which is connected to the shaft H by a clutch $H^3$, controlled by a hand-lever $H^4$, it being noted that the shaft H extends horizontally across the lower front portion of the machine, being carried by brackets which project forwardly from the lower portions of the front corner posts of the main frame; I, a longitudinally-extending shaft actuated by the shaft H and whose rear end serves to actuate a vertical shaft $I^1$; $I^2$, a continuously rotating horizontal shaft mounted in brackets carried by the rear cross-bar of the adjustable frame B and actuated by the shaft $I^1$; $I^3$, a sleeve mounted on the shaft $I^2$ and adapted to be intermittently connected with said shaft by a clutch-device $I^4$, which clutch-device is controlled by a cam (M') timed to move with the driving mechanism of the carton-transferring devices; J, driving mechanism for the carton-transferring devices and the partial-charge filling devices, said mechanism including a shaft $J^1$, a sprocket-wheel $J^2$, which is adapted to be connected, by a clutch $J^3$, to the shaft $J^1$, said sprocket-wheel $J^2$ being actuated from the shaft H by means of a sprocket-chain $J^4$; $J^5$, a cam-wheel on the shaft $J^1$, which serves to actuate the transfer mechanism $G^2$; $J^6$, a cam on the shaft $J^1$, which serves to actuate the partial-charge filling devices; K (Figs. 7 and 12), a scale-controlled dog, which controls the clutch $J^3$ and which is actuated by a link $K^1$, which is connected with an arm of a rock-shaft $K^2$, which is adapted to be rocked by the mechanism shown in Fig. 14, when the scale-beam is tripped and the closure or valve of the discharge-chute of the final feed mechanism is moved to closed position; L, a dog which also controls the clutch $J^3$ and which, in turn, is controlled, through the medium of mechanism $L^1$, by a cam $L^2$, which rotates with the sleeve $I^3$ of the service-conveyer driving means; M (Figs. 4 and 6), mechanism controlling the clutch-device $I^4$, the mechanism M being actuated by a cam $M^1$, which is formed integrally with the cam-wheel $J^5$; N, $N^1$, a pair of alined partial-charge filling devices disposed above the service conveyer E, said filling devices being so spaced as to enable them to discharge simultaneously into two cartons carried by the conveyer E, each carton receiving a portion of its charge from each of said filling devices; $N^2$ (Figs. 4 and 11), means for actuating said filling devices, said means $N^2$ being actuated by the cam $J^6$; and P, a final-feed discharge-chute disposed above the scale-pan and receiving its supply from a hopper $P^1$, through which extends a screw-conveyer $P^2$ (Fig. 3), whose vertical shaft $P^3$ is actuated by a horizontal shaft $P^4$, upon which is mounted a loose pulley $P^5$, which is adapted to be connected with the shaft $P^4$ by means of a clutch $P^6$, which is actuated by scale-controlled mechanism $P^7$.

The main frame A may be of any suitable construction. Preferably, it is formed largely of light structural steel. As indicated it is provided with corner posts 1, which may comprise angle-bars. Said corner posts are equipped with vertical guides 2, upon which are fitted cast-metal slides 3, to which the ends of the cross-bars 4 of the conveyer frame B are firmly secured. The conveyer frame B is raised or lowered by means of vertical screws 5, whose upper ends are geared to longitudinal shafts $5^a$, the shafts $5^a$ being connected by a sprocket-chain $5^b$. One of the shafts $5^a$ is fitted with a crank $5^c$. It will be understood that there are four of the vertical screws 5 which support the conveyer frame B, and that by the mechanism described the screws 5 will be simultaneously turned to raise or lower the frame B, as the case may be. The purpose of providing for raising or lowering the conveyer-frame is to adapt the machine to different-sized cartons, it being necessary that the cartons shall pass beneath the partial-charge filling devices N, N' and also beneath the final-feed discharge-chute P.

The conveyer-supporting frame B comprises, in addition to the cross-bars 4, 4 at the ends of the machine, longitudinal bars 6, 6, forming the runway of the service conveyer E (Fig. 3), and longitudinal bars 7, forming the runway of the conveyer D. Said longitudinal bars are suitably secured to brackets mounted on the cross-bars 4.

The delivery-conveyer C, which feeds the cartons to the machine, may comprise an endless belt 8, whose rear end is mounted on a pulley 9, journaled in brackets 10, which extend rearwardly from the front cross-bar 4 of the frame B; and supporting bars 11 for the belt. The bars which extend away from the machine may be pivotally supported, so that vertical adjustment of the conveyer supporting frame B will be permitted. Cartons R are shown on the belt 8 and at proper locations in the machine.

The discharge-conveyer D comprises the longitudinal bars 7, forming a part of the conveyer-supporting frame B; an endless belt 12, having its rear end supported on a roller 13, which is mounted on a shaft 14 in alinement with the shaft $I^2$, the shaft 14 and the sleeve $I^3$ being driven in opposite directions by means of bevel-gears located on opposite sides of a bevel-gear 15 on the vertical shaft $I^1$, so that the conveyers D and E run in opposite directions; a roll 16 near the rear end of the machine, beneath which the top portion of the belt 12 passes, and a roller 17 journaled in hangers depending from the front cross-bar 4 of the frame B, which supports or steadies the lower portion of the belt 12.

The shafts $I^2$ and 14 are carried by rearwardly extending brackets 18 mounted on the rear cross-bar 4 of the frame B.

The service-conveyer E, which is intermittently actuated, and which serves to advance the cartons step-by-step and position them *seriatim* beneath the partial-charge filling-devices N and $N^1$, comprises (Figs. 4 and 5), in addition to the longitudinal bars 6 which form a part of the conveyer-supporting frame B, a pair of endless chains 19, mounted on front sprocket-wheels 20 and rear sprocket-wheels 21, the latter pair of sprocket-wheels being mounted on the sleeve or tubular shaft $I^3$ of the driving mechanism for the conveyer E; carton-engaging members, or blades, 22, mounted upon the chains at intervals corresponding to the spacing of the filling devices N and $N^1$, as well as with the space between the filling device $N^1$ and the transverse plane in which the scale-pan is located; and longitudinal carton-guides 23 disposed above the endless chains and carried by brackets 24, which are adjustably mounted on the longitudinal bars 6 of the conveyer, thus enabling the bars 23 to be adjusted toward and away from each other. The sprocket-wheels 20 are mounted on a shaft 25, carried by brackets 26, which are carried by and project forwardly from the front cross-bar 4 of the frame B. The shaft 25 is mounted in adjustable bearings, enabling the sprocket-chains 19 to be made taut. This feature is not illustrated in detail, but any suitable adjusting means may be employed.

Extending transversely across the frame of the machine and suitably mounted on the frame is a pair of rods 27 (Figs. 1 and 5). These rods support a pair of guide-bars 28, corresponding with the service-conveyer E, and a pair of guide-bars 29, corresponding with the discharge-conveyer D. The set of guide-bars 28 is supported by threaded vertical rods or hangers 30, on which the brackets which carry the bars 28 are vertically adjustable. The rods 30 depend from adjustable sleeves 31, mounted on the cross-rods or shafts 27, so that the bars 28 may be adjusted toward or from each other by moving the collars or sleeves 31.

The guide-bars 29 are similarly adjustable vertically on threaded rods 32, which depend from collars 33, adjustably mounted on the transverse bars or rods 27. The purpose is to adapt the guides to cartons of varying sizes.

The cartons R are delivered by the belt 8 against a stop 34 (Fig. 4), which is so positioned that the rearmost carton on the belt 8 will be disposed opposite the carton-transferrer G, which operates in front of the feed-chute of the first filling device N. The carton-guides 23 and 28, which are nearest the delivery conveyer C, are cut away, as indicated at 35, to admit the cartons to the service-conveyer E. One of the carton-guides 29 associated with the discharge-conveyer D is shorter than the other, and is bent toward the conveyer E, as indicated at 36, so that the weighed package will be admitted to the conveyer D and guided thereonto.

The scale F comprises, in addition to the scale-pan $F^1$, a pair of vertical hanger-bars 37 upon which the scale-pan is supported, a head or yoke 38, carrying the bars 37 (Fig. 14), the arms of the member 38 being supported on knife-edges 39, carried by the short arm of the scale-beam 40, a base or scale-support 41 carried by bars 42, which constitute a chair, or braced-support, firmly mounted on the main frame A (Figs. 1 and 14); knife-edges 43, carried by the support 41 and on which the scale-beam 40 is placed; and a weight 44 suspended by a rod 45 from the free end of the scale-beam.

The support 41 embraces the lower end of the chute P of the final-feed filling device; and the arms of the yoke 38, as well as the short arms of the scale-beam 40, freely embrace the chute P. The chute P is provided with a sliding valve or closure 46, which is actuated by a bell-crank lever 47, mounted on a pivot 48, the short arm 47$^a$ of said lever having connected therewith a spring 49, whose upper end is secured to a bracket 50 carried by one of the longitudinal members of the frame A. The pivot 48 is carried by a bracket 51, which is mounted on one of the longitudinal members of the frame A. For the purpose of holding the slide or valve 46 in the open position, the bell-crank lever 47 is equipped with an additional short-arm 47$^b$, with which is connected a link 52, which has pivotal connection at 53 with one arm of a latch-controlled lever 54. The lever 54 is mounted on a rock-shaft 55, carried by a bracket 56 mounted on the main frame. The upper end of the lever 54 is equipped with a short arm carrying a roller 57 adapted to engage the latch-lever. The upper end of the lever 54 is also equipped with a roller 58, adapted to be engaged by one arm 59 of a bell-crank lever which is journaled on the shaft 55, the other arm, 59$^a$, being pivotally connected with a cam-actuated vertical bar 60, which is adapted to be raised at intervals by means of a cam 61 (Fig. 3) mounted on the shaft J$^1$. The roller 57 with which the lever 54 is equipped is adapted to engage the horizontal arm 62 of a bell-crank latch-lever, which is pivotally supported at 63 and has an upwardly extending arm 62$^a$, which has its upper end provided with a laterally extending catch 62$^b$. The catch 62$^b$ is adapted to engage a notch of a latch-member 64 which is pivotally mounted at 65 on a stationary support, which may be formed integrally with or carried by the member 41.

The end of the scale-beam is equipped with an upwardly extending projection or finger 66, which is adapted to engage the extremity 64$^a$ of the latch-lever 64, so that when the scale is tipped, the member 66 will cause the member 64 to release the bell-crank latch-lever comprising the arms 62 and 62$^a$, thereby releasing the lever 54 and enabling the spring 49 to close the slide 46. The parts are restored to the latched position during the operation of the shaft J$^1$, which causes the cam 61 to elevate the member 60 and rotate the rock-lever comprising the arms 59 and 59$^a$. In this movement, the arm 59 engages the roller 58 and forces the upper end of the lever 54 inwardly until the roller 57 engages a notch 67 with which the long arm 62 of the bell-crank latch-lever is provided. It will be noted that the pivot 53 is only slightly out of alinement with the pivot 55 and the pivot connecting the link 52 to the arm 47$^b$. Thus, a toggle-joint effect is gained, so that the restraining lever 54, which holds the bell-crank lever 47 in restraint, will be held easily by the latch mechanism described.

The slide 46 is connected with a crosshead 68, which has a cam 68$^a$ adapted to engage a laterally-extending arm 69, with which the rock-shaft K$^2$ is equipped, so that when the slide 46 is thrown to the closed position, the rock-shaft K$^2$ will be rocked so as to depress the link K$^1$ and release the dog K (Fig. 7) from the locking position, so that the shaft J$^1$ will be actuated so as to operate the transferring devices and the partial-charge filling devices N and N$^1$.

The screw-conveyer or positive feed device P$^2$, as has been pointed out, is actuated by the shaft P$^4$ when the continuously running pulley P$^5$ is connected, by the clutch P$^6$, to the shaft P$^4$. The clutch P$^6$ is shifted by a lever 70 forming a part of the clutch-control P$^7$. The lever 70 is mounted on a pivot 71, carried by a bracket 72 projecting laterally from the main frame. A spring 73 tends to actuate the lever 70 in a direction to disengage the clutch. The lower end of the lever is held outwardly, against the force of the spring 73, by a toggle-link device, comprising links 74 and 75, which are pivotally connected at 76. The outer end of the link 74 is connected by the pivot 77 to the lower end of the lever 70; and the inner end of the link 75 is connected, by the pivot 78, to a stationary part. The link 60 is equipped with an upward extension 60$^a$, which is provided at its upper end with a roller adapted to strike the toggle-joint when the member 60 is elevated by the cam 61, thus restoring the parts to the position shown in Fig. 14, in which movement the clutch P$^6$ is thrown into operative engagement. The toggle-links 74 and 75 are broken downwardly by means of a bell-crank lever supported on a pivot 79, carried by a stationary member and comprising a cam-actuated arm 79$^a$ and an arm 79$^b$ (shown brokenly in Fig. 14), which is adapted to strike the toggle-links 74 and 75 and depress them. For this purpose, the arm 79$^b$ is equipped with a projection fitted with a roller 79$^c$, adapted to strike the upper edges of the links 74 and 75 at the joint 76. The free end of the arm 79$^a$ is equipped with a roller 79$^d$, which is adapted to be engaged by a cam 68$^d$ with which the head 68 is provided. Thus, when the slide or closure 46 is moved into position to close the lower end of the chute P, the bell-crank lever comprising arms 79$^a$ and 79$^b$ will be actuated to depress the roller 79$^c$, break the toggle-joint 74 and 75 downward, and permit the spring 73 to actuate the lever 70 and disengage the clutch P⁶.

As shown in Fig. 14, the lower end of the lever 54 is prevented from swinging inwardly too far by means of an adjustable stop 80, carried by a stationary arm 81.

The scale-pan F¹ is located slightly below the plane of the upper side of the conveyer E, and slightly above the upper side of the conveyer-belt 12, so that in the operation of the carton-transferring device G¹, the cartons will slide freely from the service-conveyer E to the scale-pan, and from the scale-pan to the discharge-conveyer D. The scale-pan comprises bars 82 fixedly secured to a threaded bolt 83, which extends through slots 84, with which the hangers 37 are provided. The bolt 83 is firmly clamped to the bars 37 by means of clamp-nuts, as will be understood from Figs. 4 and 14. By the means described, the scale-pan F¹ may be adjusted vertically to correspond with the adjustment of the conveyer-supporting frame B in adapting the machine to varying sizes of cartons.

The carton-transferring devices comprise the pushers G and G¹, and the actuating mechanism G². Each of said pushers is carried by a stem 85 (Fig. 4), which is adjustably mounted in a slide 86 (Fig. 5), which is actuated through the medium of a link 87 and an arm 88. The arms 88 are fixedly secured to a rock-shaft 89, which extends longitudinally of the frame, as shown in Fig. 1. Fixedly secured to the rock-shaft 89 is an arm 90, which is connected by a link 91 to a slide-bar 92, actuated by the cam-wheel J⁵. The cam-wheel J⁵ is provided with an annular groove 93 which is eccentric to the shaft J¹, as shown in Fig. 6. In the groove 93 moves a roller 94, which serves to actuate the slide-arm 92, shown in Fig. 1. This kind of a movement is not new *per se*. It is illustrated, for instance, in my Patent No. 1,140.915, granted May 25, 1915 (see Fig. 10 of said patent). It readily will be understood that when the slide 92 is reciprocated vertically by the cam J⁵, the pushers G and G¹ will be simultaneously reciprocated. The pusher G¹ is set farther inwardly, of course, than is the pusher G, as will be understood from Fig. 4.

The main drive-shaft H of the machine is actuated, as has been stated, by the continuously running sprocket-wheel H² when the clutch H³ is in position to clutch the sprocket-wheel to the shaft. The detail of the clutch is unimportant.

As has been stated, the longitudinal shaft I runs continuously, thus, through the medium of the vertical shaft I¹, driving the shaft I² continuously and also driving the shaft I², which actuates the discharge-conveyer D continuously.

The clutch I⁴ (see Figs. 4ᵃ and 6) comprises a wheel 95 secured to and adapted to actuate the sleeve I³; a ratchet-wheel 96, secured to the shaft I²; and a pawl 97, supported on a pivot 98, carried by the wheel 95. A spring 99 tends to throw the hook of the pawl into engagement with the ratchet. When this occurs, the wheel 95 will turn and rotate the sleeve I³ one revolution, thus advancing the service-conveyer E one step.

When the wheel 95 completes its revolution, the projecting finger or tail-piece of the pawl is engaged by a hook 100, forming a part of a lever 101. This constitutes a portion of the cam-controlled mechanism M, which has a link 102 of adjustable length connecting the inner arm of the lever 101 with a bell-crank lever 103, one of whose arms is equipped with a roller, which is adapted to be actuated by the cam M¹, carried by the cam-wheel J⁵. The pivotal portion 103ᵃ of the bell-crank lever 103 is in the form of a sleeve or tubular rock-shaft, which is journaled upon the rock-shaft of the mechanism about to be described. The dog L (which is one of the dogs controlling the clutch J³) is controlled by a cam 104, which is mounted on or may be formed integrally with the wheel 95 (Fig. 7). This control is effected through the medium of the mechanism L¹, which comprises a cam-lever 105, mounted on the bracket 106 which supports the lever 101; an adjustable link 107 connecting the inner or front end of the lever 105 to one arm 108 of a bell-crank lever, whose rock-shaft 109 supports the sleeve 103ᵃ. The other end of the rock-shaft 109 is equipped with an arm 110, which is connected by the link 111 to the bell-crank dog L.

The clutch J³ will be understood from Figs. 7, 12 and 13. The clutch proper is not novel, being illustrated in detail in my Patent No. 1,126,083, granted Jan. 26, 1915. The shaft J¹ has keyed or otherwise secured thereon, a collar 112, from which projects an arm 113 fitted with a spring 114. The spring 114 bears against an arm 115, which is secured to a rocking clutch-pin 116, which is journaled in the member 112, and which has a semi-cylindrical portion 116ᵃ, which projects within an annular flange 117 with which the sprocket-wheel J² is equipped, this flange being provided with a series of semi-circular recesses 118. When the dogs K and L are free from engagement with the arm 115, the spring 114 will actuate said arm, rotate the pin 116 and cause the clutch portion 116ᵃ to engage one of the recesses 118, as shown in Fig. 13. Thus, the shaft J¹ will turn through one revolution, when the arm 115 will again engage the dogs and release the clutch.

In Fig. 4, the point Y is the point where the carton is fed onto the service-conveyer; the point Y¹ indicates the position of a carton disposed below the partial-charge feed device N; the point Y² indicates the point where a carton R is positioned beneath the filling device N¹; and the point Y³ indicates the position of a carton R which is ready to be moved onto the scale-pan F¹. The spacing of the pushers on the endless conveyer E is uniform, and corresponds with the spacing between the filling devices N and N¹.

Each of the filling devices N and N¹ is of the construction shown in Fig. 11. There is a hopper 119, which may serve for both filling devices, in which case it is in the form of an elongated hopper, as appears from Fig. 1. This hopper is provided with a discharge passage 120 for each filling device, beneath which is located a pivotally mounted chute or open-ended measure 121. The chutes or measures 121 are mounted on a rock-shaft 122, equipped with an actuating arm 123, which is connected by a link 124 with a rock-lever 125, which constitute a part of the actuating mechanism N². The rock-lever 125 has one arm connected to a link 126, whose lower end is connected with a cam-lever 127 (Figs. 1 and 4), which has its rear end supported on a pivot 128 and its intermediate portion engaging the cam J⁶, which is mounted on the shaft J¹. When the shaft J¹ rotates, it actuates the carton-transferrers and shifts the chutes 121 from the filling or charge-accumulating position shown in Fig. 11 to the discharge position, and then returns them to the position shown in Fig. 11. The lower ends of the measures 121 are adapted to swing over discharge-chutes 129, beneath which the cartons are positioned when the service-conveyer is at rest. The chutes 129 are surmounted by plates 130, whose upper surfaces are of the shape of an arc of a cylinder. The plates 130 are provided with passages 131 and with extensions 132, forming bottoms for the measures when they are in the position shown in Fig. 11. The upper ends of the measures are provided with part cylindrical extensions 121ᵃ adapted to close the chutes 120, and the chutes 120 are provided with curved lateral extensions 120ᵃ, which close the upper ends of the measures 121 when they are moved to the discharge position.

The partial-charges accumulate in the measures 121, while the service conveyer is in operation; and after the service-conveyer stops, the operation of the transferring devices and the actuation of the measures 121 occurs. The discharge from the measures to the cartons is quickly effected, and the measures are returned to the charge-accumulating position before the service-conveyer is again actuated.

Referring to Figs. 8, 10, the longitudinal bars 6, which form a part of the frame B, also form a part of the service-conveyer E. Provision is made at the point or station Y² for supporting the carton clear of the chains 19 to facilitate transfer of the cartons from the conveyer E to the scale-pan. For this purpose, the longitudinal bars 6 of the conveyer frame are equipped with transverse bars 133, which support a central longitudinal bar 134, to the top of which is secured a thin plate 135, whose longitudinal edge portions freely overlap the chains 19. The plate 135 has an inclined extension 135ᵃ, whose free end extends below the level of the chains 19, so that the carton will ride up the incline and be positioned on the plate 135. The pushers 22 are mounted on transverse bars 22ᵃ, attached to the chains 119 and sufficiently elevated to clear the plate 135. The longitudinal bar 6 which is adjacent the scale-pan F¹ is also equipped with an angle 136, whose horizontal flange 136ᵃ is substantially flush with the plate 135, so that the carton will ride over the flange 136ᵃ while being moved onto the scale-pan. Thus, the conveyer-chains are bridged by plates upon which the carton rests and slides in the transverse movement.

The conveyer E is likewise equipped with bridge-plates at the point Y, where the cartons are deposited on the service conveyer.

The scale is steadied against swaying movement by means of links 137 (Fig. 3), one of which is pivotally connected with a bracket 138 depending from one of the side members of the main frame. No novelty is claimed for this feature.

As shown in Fig. 3, the shaft J¹, which actuates the pushers and the measures, is equipped with a cam J⁷ which actuates a steadying device for the scale, and with a cam J⁸, which actuates a scale-lock releasing device. The cam J⁷ actuates a vertical slide 139, whose upper end has a forked extremity or yoke 139ᵃ, which engages a bolt 140 (Fig. 14) with which the bars or hangers 37 of the scale are equipped at their lower ends.

The cam J⁸ actuates a link 141, whose upper end is pivotally connected with a rocking cage or guide 142 (Figs. 1 and 3), in which travels a ball 143. The cage 142 is normally in the position shown in Fig. 1, in which position the ball 143, which gravitates to the lower end of the cage, engages a swinging link or latch 144 (shown brokenly in Fig. 14), whose lower end is adapted to swing to a position over the upper edge of the scale-beam. During the operation of the carton-transferring devices, the cage 142 is lowered, or swung downwardly, allowing the ball 143 to gravitate away from the latch 144, and thus the latch 144 will hold the scale-beam locked while the nearly filled carton is being moved onto the scale-pan. The lock for the beam of the scale operates upon the principle of the lock shown in detail in Figs. 33-35 of my Patent No. 1,126,083, granted Jan. 26, 1915. No novelty therefor is claimed in the present application, except in the relation which this device occupies in the improved machine.

In Fig. 1, the rock-shaft $K^2$, which is controlled by the scale-beam and which is actuated by the closure for the chute P, is shown equipped with an arm 145 bearing a counterbalance weight 146.

The machine operates as follows:

The shaft H rotates continuously and drives the shaft $I^2$ continuously and also drives the gear $J^2$ continuously. The endless delivery-conveyer C and the endless discharge conveyer D may connect with a carton-opening and sealing machine (not shown). Such a machine will operate to open cartons and seal the lower ends thereof and deposit the cartons with the open end up on the delivery belt 8. The filled and weighed cartons will be returned to the sealing machine by the conveyer D, and the sealing machine will operate to close and seal the upper flaps of the carton, and then discharge the packages. The drive-chain $H^1$ may be driven from the carton-opening and sealing machine.

Assuming cartons R to be in the machine in the positions indicated, the machine will operate automatically, it being understood that in first setting the machine in motion, the cartons arriving at the point $Y^3$ must be sufficiently filled preliminarily to effect the tripping of the scale when the carton receives the final-feed from the discharge-chute P; otherwise, it will be necessary to trip the machine by hand a few times, until the regular operation is established. Thereafter, each carton arriving at the point $Y^1$ (Fig. 4) receives something less than a half-charge; and when it arrives at the point $Y^2$ it receives something less than a half-charge, the aggregate amount being slightly less than that necessary to trip the scale.

After the transferring devices have operated, which is effected in one complete revolution of the shaft $J^1$, during which period the measures 121 (Fig. 11) have been swung to the discharge position and then returned to the charge-accumulating position, the cam $M^1$ on the wheel $J^5$ operates the mechanism M (Fig. 6) and clutches the tubular actuating shaft $I^3$ of the conveyer E to the shaft $I^2$. This causes the cartons to be advanced one step. Upon the completion of the revolution of the tubular shaft $I^3$, the cam 104, carried by the wheel 95 (Fig. 7) actuates the mechanism $L^1$ and releases the dog L, which controls the clutch $J^3$. When sufficient material is fed from the chute P to give the requisite weight to the package on the scale-pan, the scale-beam operates, releasing the compounded latch members which normally restrain the movement of the slide-actuating lever 47 (Fig. 14). The slide 46 is then forced to the closing position; and in this movement the cam $68^a$ operates the rock-shaft $K^2$ and releases the dog K, which controls the clutch $J^3$, thus throwing into operation the shaft $J^1$ which actuates the carton-transferring devices, the measure-actuating mechanism, the scale-steadying device 139, and the scale-lock controlling means 142. Also, when the slide 46 is moved to close the lower end of the chute P, the cam $68^d$ operates the bell-crank lever comprising the arms $79^a$ and $79^b$, thus releasing the clutch $P^6$ and throwing out of operation the positive material-feeding device $P^2$ with which the chute P is equipped. When the shaft $J^1$ completes its revolution, the hook-latch-lever 101 of the mechanism M is released to permit the clutch $I^4$ to be again thrown into operative engagement to advance the conveyer E another step. Referring to Fig. 7, it should be explained that the cam-roller of the lever 105 travels on the periphery of the disk or wheel 95 after leaving the cam 104, so that the dog L will be held in the locking position, that is, in the position of holding the clutch $J^3$ in the released or inoperative position until the conveyer E has completed its step, whereupon the cam 104 throws the dog L away from the clutch-restraining position.

It may be stated here that the mechanism $L^1$ is equipped with a spring 147, which serves to hold the lever 105 in contact with its cam; and the mechanism M is equipped with a spring 148, which tends to throw the lever 101 into position to disengage the pawl 97 from the ratchet-wheel 96.

The horizontal frame or platform B, which supports the conveyers, may be adjusted vertically to accommodate the machine to cartons of varying sizes; and the connecting rods 102 and 107 of the mechanisms M and $M^1$ may be adjusted to correspond with the adjustment of the skeleton platform B. The carton-guides may be adjusted to correspond with the varying sizes of packages.

The machine described may be driven at comparatively high speed without interfering with the certainty of operation or accuracy of results. Thus, the machine is capable of a large output.

The foregoing detailed description has been given for clearness of understanding only, and no unnecessary limitation should be understood therefrom, but the appended claims should be construed as broadly as permissible in view of the prior art.

What I regard as new and desire to secure by Letters Patent is—

1. In a machine of the character set forth, delivery and discharge-conveyers, an interposed service-conveyer, carton transferring mechanism, operating means for said service-conveyer controlled from the operating means of said carton transferring mechanism, and operating means for said carton transferring mechanism controlled from the operating means of said service-conveyer.

2. In a machine of the character set forth, delivery and discharge conveyers, an interposed service-conveyer, carton transferring mechanism, operating means for said service-conveyer controlled from the operating means of said carton transferring mechanism, operating means for said carton transferring mechanism controlled from the operating means of said service-conveyer, a scale, and scale-controlled means controlling the operating means of said carton transferring mechanism.

3. In a machine of the character set forth, a service - conveyer, a discharge - conveyer substantially parallel therewith, a scale having a load-platform interposed between said conveyers, a final feed discharge-chute disposed above said load-platform, a partial-charge feed-chute disposed above said service - conveyer, conveyer operating means adapted to intermittently actuate said service-conveyer, a carton - transferrer, carton-transferrer operating means, scale - controlled controlling means for said carton-transferrer operating means, controlling means timed with said service-conveyer and controlling said carton-transferrer operating means, and controlling means timed with said carton-transferrer and controlling said conveyer operating means.

4. In a machine of the character set forth, an endless delivery-conveyer, an endless discharge-conveyer parallel therewith, an interposed endless service-conveyer, a scale having a load-platform disposed between said service-conveyer and said discharge-conveyer, a series of partial-charge filling devices disposed above said service-conveyer, a pair of transversely-movable carton-transferrers, operating means adapted to intermittently actuate said service-conveyer, operating means adapted to intermittently actuate said carton-transferrers and said partial-charge filling devices, and controlling means interposed between said first-named operating means and said second-named operating means, whereby each of said operating means controls the movement of the other operating means.

5. In a machine of the character set forth, the combination of a frame, an endless service - conveyer extending longitudinally thereof, an endless discharge-conveyer extending parallel with said service-conveyer, a plurality of partial-charge filling devices mounted in said frame some distance back of the front end of said service-conveyer, a scale having a load-platform disposed between said conveyers back of said partial-charge filling devices, final feed filling mechanism having a discharge spout disposed above said load - platform, transversely-working carton-transferrers, one of which is located in front of said partial-charge filling devices and the other of which is located back of said partial-charge filling devices, means for delivering empty cartons to the first carton-transferrer, and operating means for said service-conveyer and said carton-transferrers, constructed and arranged to intermittently actuate them in succession, and a scale-controlled controlling device for said operating means.

6. In a machine of the character set forth, the combination of a frame, a longitudinally - disposed endless service - conveyer mounted therein, an endless discharge-conveyer substantially parallel therewith, a scale having a pan disposed between said conveyers near the rear end of the machine, a final feed filling device disposed above the scale-pan, a measure disposed above the service-conveyer some distance in front of the scale-pan, a pair of carton-transferrers, one corresponding with the position of the scale-pan and the other disposed in front of said measure, means for delivering empty cartons to the front carton-transferrer, operating means adapted to intermittently actuate the service-conveyer, operating means adapted to intermittently actuate the carton-transferrers and said measure, controlling devices interposed between said operating means, whereby each operating means controls the operation of the other operating means, and a scale-controlled controlling device controlling one of said operating means.

7. In a machine of the character set forth, the combination of a plurality of alined measures serving as partial-charge filling devices, an intermittently actuated service-conveyer beneath said measures, a scale having a scale-pan disposed at one side of said service-conveyer in the rear of said measures, operating means for intermittently actuating said conveyer, a carton-transferrer corresponding with the position of the scale-pan, operating means for intermittently actuating said carton-transferrer, controlling devices interposed between said operating means, whereby each operating means controls the other, a scale-controlled controlling device controlling the operating means for the carton-transferrer, means for delivering cartons to the front end of said service-conveyer, and means for receiving and discharging the filled and weighed packages.

8. In a machine of the character set forth, the combination of a frame, a longitudinally-disposed service-conveyer mounted therein, a measure disposed above said conveyer at some distance in the rear of the front end thereof, said measure serving as a partial-charge filling device, a scale having a pan disposed at one side of said conveyer in the rear of said measure, transversely-working carton-pushers, one of which is positioned to correspond with said scale-pan and the other of which is positioned in front of said measure, a transversely-extending cam shaft disposed beneath said conveyer and equipped with a cam serving to actuate said pushers and a cam serving to actuate said measure, a clutch controlling the operation of said cam-shaft, a clutch controlling the operation of said conveyer, means timed to move with said conveyer and controlling the operation of said first-named clutch, means timed to move with said cam-shaft and controlling the operation of said second-mentioned clutch, and a scale-controlled controlling device controlling one of said clutches.

9. In a machine of the character set forth, the combination of a frame, a longitudinal service-conveyer therein, a partial-charge filling device above said conveyer, a scale having a pan disposed at one side of said conveyer in the rear of said filling device, a final feed filling device disposed above the scale-pan, a pair of transversely-moving pushers, one corresponding with the position of the scale-pan and the other disposed in front of said partial-charge filling device, a longitudinally-disposed rock-shaft equipped with means for actuating said carton-pushers, a transversely-disposed cam-shaft below the plane of said conveyer, equipped with a cam serving to actuate said rock-shaft and with a cam serving to actuate said partial-charge filling device, a clutch controlling the operation of said cam-shaft, an actuating shaft for the rear end of said conveyer, a clutch for said last-named shaft, a cam on said cam-shaft and mechanism actuated thereby controlling the clutch of said conveyer-shaft, a cam rotating with the conveyer-shaft and mechanism actuated thereby controlling the clutch of the cam-shaft, and a scale-controlled controlling device controlling the clutch of said cam-shaft.

10. In a machine of the character set forth, the combination of a frame, a longitudinal service-conveyer mounted therein, having a transverse-actuating shaft at its rear end, a partial-charge filling device disposed above said conveyer, a scale having a pan disposed at one side of said conveyer, a carton-pusher adapted to move the partially filled cartons from said conveyer to said scale-pan, a vertically-movable steadying device for the scale-pan, a cam-shaft disposed below the plane of said conveyer and equipped with cams for actuating the carton-pusher, the partial-charge filling device and the pan-steadying device, a clutch controlling the operation of said cam-shaft, a clutch controlling the operation of said conveyer-shaft, a cam on said cam-shaft and mechanism controlled thereby controlling the clutch of said conveyer-shaft, a cam rotating with the conveyer-shaft and mechanism controlled thereby controlling the clutch of said cam-shaft, a final feed device disposed above the scale-pan, a scale-controlled device controlling the feed from said final feed device, and scale-controlled controlling means controlling the operation of the clutch of said cam-shaft.

11. In a machine of the character set forth, the combination of a frame, a longitudinal service-conveyer mounted therein, a delivery-conveyer at one side of said service-conveyer and having the same direction of movement, a discharge-conveyer at the other side of said service conveyer and having an opposite direction of movement, a scale having a pan interposed between said service-conveyer and said discharge-conveyer, a plurality of partial-charge filling devices disposed above said service-conveyer, a final feed filling device disposed above the scale-pan, a pair of transversely-moving carton-pushers, one located to correspond with the position of said scale-pan and the other located in front of said partial-charge filling devices, a cam-shaft equipped with cams serving to actuate said carton-pushers and said partial-charge filling devices, a clutch controlling the operation of said cam-shaft, a conveyer-shaft serving to actuate said service-conveyer, a clutch for said conveyer-shaft, a clutch-controlling device for the clutch of each shaft controlled by a cam on the other shaft, and scale-controlled means controlling the operation of said mechanisms.

12. In a machine of the character set forth, the combination of a main frame, a vertically-adjustable, substantially horizontal conveyer-supporting frame, mounted in the main frame, a service-conveyer mounted on said conveyer-supporting frame, means for delivering cartons to the front end of said service-conveyer, a partial-charge filling device disposed above said conveyer, a discharge-conveyer mounted on said conveyer-frame and disposed substantially parallel with said service-conveyer, a scale having a pan disposed between said conveyers near the rear end of the machine, a carton-transferrer operative to transfer cartons from the service-conveyer to the scale-pan, driving mechanisms for intermittently actuating said service-conveyer, said carton-transferrer and said partial-charge filling device, said driving mechanisms being so timed that the carton-transferrer and partial-charge filling device are operated simultaneously in alternation with the service-conveyer, and scale-controlled means controlling said driving mechanisms.

13. In a machine of the character set forth, a main frame, a substantially horizontal conveyer-supporting-frame therein, connections between said frames whereby said conveyer-frame may be adjusted vertically, a service-conveyer mounted on said conveyer-supporting-frame, and a partial-charge filling device mounted on the main frame above said service-conveyer.

14. In a machine of the character set forth, a main frame, a conveyer-supporting-frame vertically adjustable on the main frame, a delivery-conveyer having its rear end supported on said conveyer-supporting-frame, a service-conveyer mounted on said conveyer-supporting-frame, a discharge-conveyer mounted on said conveyer-supporting-frame, a plurality of partial-charge filling devices mounted on the main frame above said service-conveyer, a scale mounted on the main frame and having a scale-pan disposed between said service-conveyer and said discharge-conveyer, a carton-transferrer for transferring cartons from said service-conveyer to said scale-pan, a final feed filling device disposed above said scale-pan, and scale-controlled operating means for the service-conveyer, the partial-charge filling device, and the carton-transferrer.

15. In a machine of the character set forth, the combination with scale-controlled filling devices and a scale-pan, of an intermittently actuated service-conveyer on one side of said scale-pan, a continuously actuated discharge-conveyer at the other side of said scale-pan and closely adjacent thereto, and a carton-transferrer timed to operate when the service-conveyer is idle and serving to transfer a partially filled carton to the scale-pan and a weighed package from the scale-pan to the discharge-conveyer.

16. In a machine of the character set forth, the combination of a main frame, a vertically adjustable, horizontally disposed conveyer-supporting-frame mounted thereon, a service-conveyer mounted on said conveyer-supporting-frame and equipped at its rear end with an actuating shaft, a main driving shaft carried by the lower portion of the front end of the main frame, a longitudinal shaft extending rearwardly from said main driving shaft, and driving connections of adjustable length between the rear end of said longitudinal shaft and the conveyer actuating shaft.

17. In a machine of the character set forth, the combination of a main frame, a vertically adjustable, horizontally disposed conveyer-supporting-frame, a longitudinally disposed service-conveyer mounted thereon, a longitudinally disposed discharge-conveyer mounted on said conveyer-supporting-frame, a main driving shaft supported at the front end of the main frame, a longitudinal shaft actuated thereby, a vertical shaft actuated by said longitudinal shaft, a horizontal shaft serving to actuate the discharge-conveyer, a tubular shaft in alinement therewith serving to actuate the service-conveyer, and a clutch controlling the actuation of the conveyer actuating shaft.

18. In a machine of the character set forth, the combination of a main frame, a vertically adjustable, substantially horizontal conveyer-supporting-frame mounted in said main frame, an endless service-conveyer mounted on said conveyer-supporting-frame, an endless discharge-conveyer mounted on said conveyer-supporting-frame, a continuously rotating shaft extending through the rear end of the endless service-conveyer, a sleeve journaled on said shaft and equipped with sprocket wheels supporting the rear end of the endless service-conveyer, a clutch adapted to connect said sleeve and said continuously rotating shaft, a shaft in alinement with said first-named shaft and serving to actuate the discharge-conveyer, a vertical shaft having a beveled pinion engaged between beveled pinions on said first-named shafts, and a longitudinal shaft beneath the conveyer-supporting-frame and geared to said vertical shaft.

19. In a machine of the character set forth, the combination of a main frame, a vertically adjustable, horizontally disposed conveyer-supporting-frame mounted in said main frame, a service-conveyer and a discharge-conveyer mounted on said conveyer-supporting-frame, a partial-charge filling device mounted on the main frame above the service-conveyer, a scale having a pan interposed between the service-conveyer and the discharge-conveyer, a carton-transferrer, a cam-shaft mounted in the main frame below said conveyer-supporting-frame, a conveyer-actuating shaft for the service-conveyer mounted on the conveyer-supporting-frame, clutch devices on said shafts, and a cam on each of said shafts and mechanism controlled thereby controlling the clutch on the other of said shafts, said mechanism having adjustable connections to compensate for the adjustment of the conveyer-supporting-frame.

20. In a machine of the character set forth, the combination of a main frame, a main driving-shaft supported at the lower portion of the main frame, a cam-shaft journaled in the lower portion of the main frame near the rear end thereof, a gear journaled on said cam-shaft and equipped with a clutch, driving connections between said gear and said main driving-shaft, a substantially horizontal service-conveyer and a substantially horizontal discharge-conveyer supported on said frame, a pair of transverse alined shafts at the rear end of the frame, one serving to actuate the discharge-conveyer and one serving to actuate the service-conveyer, means driven from said main driving-shaft and serving to continuously rotate the conveyer-actuating shafts, a tubular shaft on the continuously rotating shaft of the service-conveyer, a clutch between said tubular shaft and the shaft on which it is journaled, a cam on said cam-shaft and mechanism controlled thereby controlling the clutch of said tubular shaft, and a cam rotating with said tubular shaft and mechanism controlled thereby controlling the clutch of said cam-shaft.

21. In a machine of the character set forth, a service-conveyer comprising a frame, a pair of endless chains, carton-pushers carried by said chains and supported above the plane of the chains, and a bridge-plate supported by the frame and overlapping the chains, said bridge-plate having an inclined approach and said carton-pushers being adapted to pass over said bridge-plate, said bridge-plate affording a surface over which a carton may slide in effecting a transfer.

22. In a machine of the character set forth, the combination of a partial-charge filling device, carton-supporting and moving means beneath said filling device, a final-feed filling device equipped with a cut-off and provided with positive feed mechanism equipped with a clutch, a scale having a scale-pan disposed beneath the final-feed filling device, and scale-controlled means controlling said clutch and cut off.

23. In a machine of the character set forth, the combination with a final-feed filling device, of a scale having a pan disposed beneath said filling device, a closure controlling the discharge from said filling device, scale-controlled means serving to actuate said closure, positive feed mechanism in said filling device, a clutch controlling the operation of said positive feed mechanism, a shifting lever for the clutch, a spring tending to actuate said lever in a direction to disengage the clutch, and scale-controlled trip mechanism serving to hold said lever in clutch-engaging position.

24. In a machine of the character set forth, the combination of a scale equipped with a load-platform, a final feed hopper provided with a discharge-chute, a valve controlling said chute, scale-controlled operating means for said valve, a screw-conveyer extending into said chute, driving means therefor equipped with a clutch, and clutch-shifting means adapted to be actuated to release the clutch when said valve is moved to closed position.

25. In a machine of the character set forth, the combination of a scale, a final-feed filling device equipped with feeding mechanism, driving mechanism for said feeding meechanism equipped with a clutch, a shifting lever for said clutch, a spring for actuating said lever in one direction, a toggle joint for actuating said lever in the opposite direction, a scale-controlled trip adapted to break said joint to permit said spring to operate said lever, and a cam-actuated member adapted to restore said toggle joint to extended position.

26. In a machine of the character set forth, the combination of a carton-conveyer, a partial-charge filling device supported above said conveyer, comprising an open-ended measure, a hopper surmounting said measure and provided with a discharge passage, and a discharge-chute below said measure equipped with means for closing the lower end of the measure when the measure is in the charge-accumulating position.

27. In a machine of the character set forth, the combination of an endless carton-conveyer, a hopper, an oscillating measure adapted to receive a measured charge from said hopper, a discharge-chute below said measure and above said carton-conveyer, and means for periodically shifting said measure to discharge its contents.

28. In a machine of the character set forth, the combination of a conveyer, means disposed above said conveyer and adapted to deliver a measured partial-charge to a carton carried by said conveyer, a scale having a pan disposed adjacent said conveyer, means for transferring cartons from said conveyer to said scale, a final-feed filling device disposed over the scale-pan, scale-controlled means controlling the discharge from said final-feed filling device, a positive feed device in said final-feed filling device, a clutch controlling the operation of the same, and scale-controlled means controlling said clutch.

29. In a machine of the character set forth, the combination of a frame, a longitudinal service-conveyer mounted therein, a delivery-conveyer at one side of said service-conveyer, means for delivering cartons from said delivery-conveyer to the front end of said service-conveyer, means for intermittently actuating said service-conveyer, a discharge-conveyer on the opposite side of said service-conveyer, a scale having a pan interposed between said service-conveyer and said discharge-conveyer, a partial-charge filling device disposed above said service-conveyer, a final-feed filling device disposed above said scale-pan, a carton-transferring device located to correspond with the position of the scale-pan, a scale-pan-steadying device, a scale-lock, a scale-lock-releasing-device, a cam-shaft equipped with a cam for actuating said carton-transferring device, equipped also with a cam for actuating said steadying-device and equipped also with a cam for actuating said scale-lock-releasingdevice, and a scale-controlled clutch controlling the operation of said cam-shaft.

30. In a machine of the character set forth, the combination of a scale provided with a scale-pan, a filling device provided with positive feed mechanism, driving mechanism for said feed mechanism equipped with a clutch, a lever controlling said clutch, a spring serving to actuate said lever in one direction, a toggle joint adapted to actuate said lever against the force of said spring, a scale-controlled trip adapted to break said toggle joint and permit said spring to operate the clutch-shifting lever, and a cam-controlled bar adapted to restore said toggle joint to extended position.

CHARLIE REDD.